(12) United States Patent
Locke et al.

(10) Patent No.: US 7,277,532 B2
(45) Date of Patent: Oct. 2, 2007

(54) CALL MONITORING APPARATUS AND METHOD THEREFOR

(75) Inventors: Peter Holloway Locke, West Lothian (GB); John William Forsyth Macartney, Edinburgh (GB); Richard Beattie, Edinburgh (GB); Alan Gardner, Fife (GB)

(73) Assignee: Agilent Technologies, Inc., Palo Alto, CA (US)

( * ) Notice: Subject to any disclaimer, the term of this patent is extended or adjusted under 35 U.S.C. 154(b) by 407 days.

(21) Appl. No.: 10/254,137

(22) Filed: Sep. 25, 2002

(65) Prior Publication Data

US 2003/0076936 A1    Apr. 24, 2003

(30) Foreign Application Priority Data

Oct. 24, 2001    (EP)    ............................... 01309014

(51) Int. Cl.
*H04M 15/00*    (2006.01)
(52) U.S. Cl. ............... 379/112.01; 379/126; 379/133
(58) Field of Classification Search ............... 379/126, 379/127.01, 32.01, 32.02, 32.03, 32.04, 1.01, 379/9, 9.02, 9.03, 9.04, 32.05, 121.05
See application file for complete search history.

(56) References Cited

U.S. PATENT DOCUMENTS

| | | | | |
|---|---|---|---|---|
| 5,008,929 A | | 4/1991 | Olsen et al. | ............... 379/112 |
| 5,506,893 A | * | 4/1996 | Buscher et al. | ........ 379/115.02 |
| 5,592,530 A | * | 1/1997 | Brockman et al. | ....... 379/32.03 |
| 5,793,839 A | * | 8/1998 | Farris et al. | ............. 379/32.03 |
| 5,799,073 A | * | 8/1998 | Fleischer et al. | ...... 379/112.01 |
| 5,970,129 A | * | 10/1999 | Asfar et al. | ............ 379/144.01 |
| 6,249,572 B1 | * | 6/2001 | Brockman et al. | .......... 379/133 |
| 6,282,267 B1 | * | 8/2001 | Nolting | .................... 379/32.03 |
| 6,298,123 B1 | * | 10/2001 | Nolting et al. | ............... 379/111 |
| 6,327,350 B1 | * | 12/2001 | Spangler et al. | ....... 379/115.01 |
| 6,366,655 B1 | * | 4/2002 | Book et al. | ............. 379/114.28 |
| 6,381,306 B1 | * | 4/2002 | Lawson et al. | .......... 379/32.01 |
| 6,397,055 B1 | * | 5/2002 | McHenry et al. | ........... 455/408 |
| 6,400,813 B1 | * | 6/2002 | Birnhak | ...................... 379/133 |
| 6,459,779 B2 | * | 10/2002 | Wardin et al. | ......... 379/112.01 |
| 6,504,907 B1 | * | 1/2003 | Farris et al. | ................... 379/35 |
| 6,539,082 B1 | * | 3/2003 | Lowe et al. | ........... 379/114.28 |
| 6,650,633 B1 | * | 11/2003 | Albers et al. | ............... 370/352 |
| 6,721,405 B1 | * | 4/2004 | Nolting et al. | ............... 379/133 |
| 6,721,554 B2 | * | 4/2004 | Gnesda et al. | ............. 455/406 |
| 6,744,866 B1 | * | 6/2004 | Nolting et al. | ............... 379/133 |

FOREIGN PATENT DOCUMENTS

WO    WO 01/20920    3/2001

OTHER PUBLICATIONS

European Search Report, Application No. EP 01 30 9014, dated Jan. 21, 2002.

* cited by examiner

*Primary Examiner*—Binh K. Tieu

(57) ABSTRACT

In a signalling network employing the SS7 signalling protocol, it is known to use masks to mine CDR stores in order to obtain data for analysis in respect of a particular customer of a communications network associated with the signalling network. However, the use of masks to mine the CDRs can result in the retrieval of unwanted CDRs or the omission of relevant CDRs. The present invention therefore provides a call monitoring apparatus that receives a CDR and accesses a reference database, comprising a list of customers and respective telephone numbers, in order to identify an association between the CDR and a given customer. Consequently, speed and efficiency of analysis of CDRs is increased.

18 Claims, 4 Drawing Sheets

CALL MONITORING APPARATUS AND METHOD THEREFOR

The present invention relates to a call monitoring apparatus for facilitating analysis of call record data in a switched communications system, for example, of the type having a signalling network operating substantially in accordance with Signalling System No. 7, whether as specified by the CCITT, ANSI, ETSI (for GSM), Bellcore or similar body, such as a network being herein referred to as an SS7 network. The CCITT Signalling System Number 7 is specified in Recommendations Q.700-Q.716 CCITT Volume VI-Fascicle VI.7, Geneva 1989, ISBN 92-61-03511-6. The present invention also relates to a method for use with the above call monitoring apparatus.

In modern switched telecommunications systems (in particular, modern PSTNs) it has become common practice to provide two related but separate network infrastructures: a bearer or transmission network for carrying end-user voice and data traffic, and a signalling network for controlling the setup and release of bearer channels through the bearer network in accordance with control signals transferred through the signalling network. In practice, such signalling networks comprise high-speed computers interconnected by signalling links; computer programs control the computers to provide a set of operational and signalling functions in accordance with a standardised protocol. One example of such a signalling protocol is the afore-mentioned Signalling System No. 7 (SS7) which is being extensively deployed for control of telephone and other data transmission networks. An SS7 network basically comprises various types of signalling points, namely, Signalling End Points (SEPs), for example an end office or local exchange, and Signalling Transfer Points (STPs) interconnected by signalling links, the SEPs being associated for example with respective Signalling Switching Points (SSPs) of the transmission network, and with Service Control Points (SCPs).

As is known in connection with SS7, signalling information is passed over the signalling links. In particular, the signalling information is carried by Message Signal Units (MSUs) in fields. Some of the fields are extracted from the MSUs to generate a Call Data Record (CDR) for storage in a CDR store. The CDRs are analysable once stored. To some extent, the CDRs can be analysed by reference to a particular customer of a telco operating the SS7 system. One example of such analysis is by use of a mask. In this respect the CDR store is searched, or "mined", for all CDRs relating to a given customer using a mask corresponding to a group of telephone numbers relating to the customer, for example, (603) 642-xxxx; the "xxxx" refers to the group of telephone numbers used by the customer. However, such a large group of telephone numbers may be shared by a number of customers, including the given customer. A number of much narrower masks than that suggested above may therefore be necessary in order to accurately mine the CDR store, for example: (603) 642-12xx, (603) 642-15xx and (603) 753-31xx for the given customer. Clearly, it can be seen that the use of the number of masks adds a level of complexity to the data mining process and a need exists to maintain records of masks. Creation of the masks may also be subject to human error that could result in data relating to customers other than the given customer being retrieved and erroneously incorporated into subsequent analysis. Additionally, if the masks are not updated as a result of the given customer acquiring additional telephone numbers, or the given customer discontinuing subscriptions for certain telephone numbers, the data mined relating to the given customer will either be incomplete and/or inaccurate. It should also be appreciated that the number of CDRs associated with the given customer would be considerable and the CDR store could include CDRs stored over a considerable period of time, for example, a period of six months. The effect of these facts is twofold: firstly, data mining for post-storage analysis of CDRs usually needs to be repeated for each analysis required, for a CDR store of 100 million CDRs, such a repeated data mining exercise is processing power intensive; secondly, where the CDR store includes historical CDRs dating back over, for example six months, the CDRs may include the additional numbers acquired by the given customer and relinquished number subsequently reallocated to other customers. In such circumstances, the masks would require a temporal element, making the mask extremely complex in structure and hence complex to create and maintain.

In an analogous manner, certain types of data can be mined from call records maintained by telcos in billing databases. However, the above-mentioned disadvantages remain applicable.

According to a first aspect of the present invention, there is provided a call monitoring apparatus for coupling to a number of links to a switch of a signalling network, the apparatus comprising a data record generator arranged to generate data record corresponding to a call or transaction, and a data processor arranged to receive the data record and identify, from a database of customer data, a customer supported by the signalling network and corresponding to the data record.

The data record generated by the data record generator may correspond to one or more of a call, a transaction, a service or other network events, for example transmission of one or more data packet over the Internet.

Preferably, the data record comprises at least one field, content of the at least one field corresponding to the customer; the database of customer data comprises information to identify the customer and an association with the content of the at least one field.

Preferably, the data processor is arranged to add additional information to the data record in response to the identification of the correspondence between the customer and the data record, the additional information corresponding to an identity of the customer corresponding to the data record.

Preferably, the data record generator is arranged to store the data record in a data record file, the data processor being arranged to update the data record stored in the data record file by adding the additional information to the data record.

Preferably, the data processor is arranged to store the data record with the added additional information in a data record file.

Preferably, the apparatus further comprises an analysis entity capable of communicating with the data processor, the analysis entity being arranged to receive the data record from the data processor and analyse the data record.

Preferably, the apparatus further comprises an analysis entity capable of accessing the data record file and retrieving the data record from the data record file and analyse the data record.

Preferably, the analysis entity is arranged to generate a metric for a communications network associated with the signalling network, the metric relating to the customer.

Preferably, the customer is selectable. More preferably, the metric also relates to another customer, the another customer being selectable.

According to a second aspect of the present invention, there is provided a switch for a signalling network, the switch comprising the call monitoring apparatus as set forth above in connection with the first aspect of the present invention.

According to a third aspect of the present invention, there is provided a signalling network comprising the call monitoring apparatus as set forth above in connection with the first aspect of the present invention.

Preferably, the signalling network further comprises a switch, the call monitoring apparatus being capable of receiving data records constructed using messages received by the switch.

According to a fourth aspect of the present invention, there is provided a method of identifying a correspondence between a data record and a customer supported by a signalling network, comprising the steps of: receiving the data record; and accessing a database of customer data and identifying the customer, from the database of customer data, that corresponds to the data record.

Preferably, the data record comprises at least one field; the content of the at least one field corresponding to the customer; the database of customer data comprises information to identify the customer and an association with the content of the at least one field.

Preferably, the method further comprises the step of: adding additional information to the data record in response to the identification of the correspondence between the customer and the data record, the additional information corresponding to an identity of the customer corresponding to the data record.

Preferably, the method further comprises the steps of: storing the data record in a data record file; and updating the data record in the data record file by adding the additional information to the data record.

Preferably, the method further comprises the step of: storing the data record with the added additional information in a data record file.

According to a fifth aspect of the present invention, there is provided a computer program element comprising computer program code means to make a computer execute the method as set forth above in connection with the fourth aspect of the present invention.

Preferably, the computer program element is embodied on a computer readable medium.

According to a sixth aspect of the present invention, there is provided a use of a database of customer data to identify an association between a data record for a signalling network and a customer, the database of customer information comprising information to identify the customer and an association with content of the at least one field of the data record.

It should be noted that any reference above to the data record includes, by definition, a detail record or a partial (incomplete) detail record, for example a call detail record, a partial call detail record, a transaction detail record, a partial transaction detail record, a service detail record, or a partial service detail record. For the avoidance of doubt, it should be understood that the database of customer data may be stored as a file on a storage device, for example, a hard disc drive or a solid state memory.

It is thus possible to provide a method and apparatus capable of providing data readily accessible by customer identity, thereby facilitating fast and efficient monitoring of communications (including transactions and services) in respect of selected or all customers. The customer data accessed according to the present invention is more likely to be accurate as compared to data accessed using masks, and facilitates improved manipulation of data mined from the file of call record data. Furthermore, the data can be accessed in real time if required, the present invention resulting in a reduction in system loading, i.e. required processing power, as compared with system loading imposed by the use of masks. Since it is possible to analyse call patterns for specific customers, problems relating to the provision of communications services can be quickly troubleshot. Other, commercial, advantages also exist, for example, the apparatus and method of the present invention facilitates a telco's ability to guarantee service level agreements with key customers, and the provision of improved data to customer for analysis may improve customer loyalty to the telco by virtue of the provision of data of integrity. The present invention facilitates analysis of call record data by customer, customer group or any aspect of a call or service stored by the call record data. In contrast with the use of masks, use of the above apparatus and method obviates the need to repeat mining a CDR store for CDRs relating to a given mask.

At least one embodiment of the invention will now be described, by way of example only, with reference to the accompanying drawings, in which.

Throughout the following description, identical reference numerals will be used to identify like parts.

Figure 1:
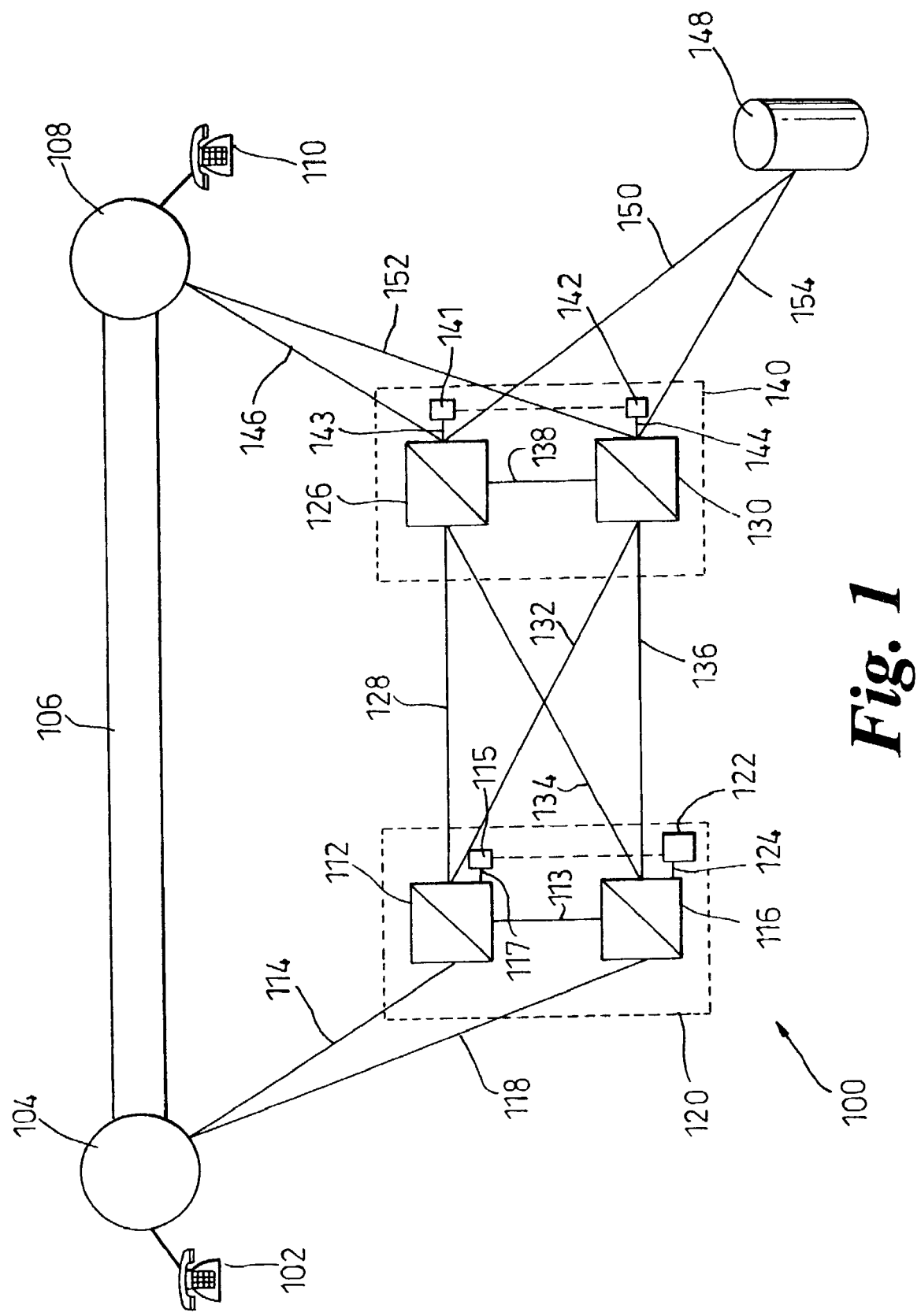
FIG. 1 is a schematic diagram of a signalling network.

Referring to FIG. 1, a signalling network 100 for a communications network, such as a telecommunications network, supports an SS7 signalling protocol and comprises a first network terminating device such as a first telephone handset 102 coupled to a first SSP 104. The first SSP 104 is capable of establishing a trunk connection 106 with a second SSP 108 and vice versa, the second SSP 108 being coupled to a second network terminating device such as a second telephone handset 110.

The first SSP 104 is coupled to a first STP 112 by a first A link 114 and a second STP 116 by a second A link 118. The first STP 112 is coupled to the second STP 116 by a first C link 113 and, together, the first and second STPs 112, 116 constitute a first mated pair of STPs 120. A first Agilent® acceSS7 Link Monitoring System (LMS) comprises a first primary collector unit 122 and a first secondary collector unit 115. The first primary collector unit 115 is, although not essentially, co-located with the first STP 112 and coupled to first links (not shown) provided by the first STP 112 by a first number of electrical connections 117 corresponding to the first links. Similarly, although not essentially co-located, in this example the first secondary collector unit 122 is co-located with the second STP 116 and coupled to second links (not shown) provided by the second STP 116 by a second number of electrical connection 124 corresponding to the second links.

The first STP 112 is coupled to a third STP 126 by a first B link 128 and a fourth STP 130 by a second B link 132. The second STP 116 is also coupled to the third STP 126 by a third B link 134 and the fourth STP 130 by a fourth B link 136. The third STP 126 is coupled to the fourth STP 130 by a second C link 138 and, together, the third and fourth STPs 126, 130 constitute a second mated pair of STPs 140. A second Agilent® acceSS7 LMS comprises a second primary collector unit 142 and a second secondary collector unit 141.

The second primary collector unit 141, although not essentially, is co-located with the third STP 126 and coupled to third links (not shown) provided by the third STP 126 by a third number of electrical connection 143 corresponding to the third links. Similarly, although not essentially co-located, in this example the second secondary collector unit 142 is co-located with the fourth STP 130 and coupled to fourth links (not shown) provided by the fourth STP 130 by a fourth number of electrical connection 144 corresponding to the fourth links.

The third STP 126 is coupled to the second SSP 108 by a third A link 146 and an SCP 148 by a fourth A link 150. The fourth STP 130 is also coupled to the second SSP 108 and the SCP 148, but by a fifth A link 152 and a sixth A link 154, respectively.

Figure 2:
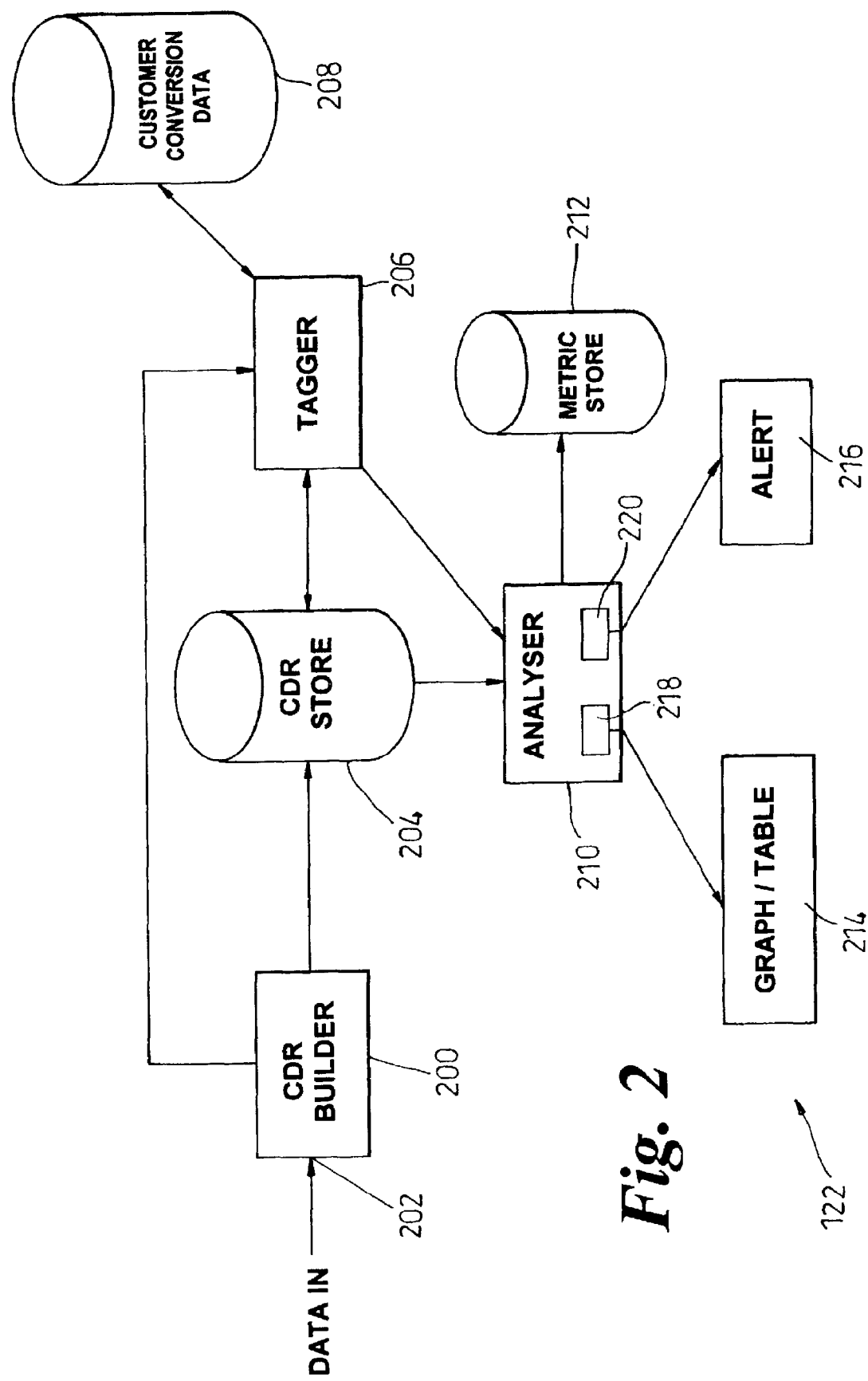
FIG. 2 is a schematic diagram of an apparatus shown in FIG. 1.

Referring to FIG. 2, the first LMS 122 comprises a Call Detail Record (CDR) builder entity 200 having a data input 202. The CDR builder entity 200 is able to generate CDRs and store the generated CDRs in a CDR store 204. In this example, the CDR builder entity 200 is embodied in software and the CDR store 204 is a data file stored on a hard disc drive. The CDR builder entity 200 and the CDR store 204 are known parts of the Agilent® acceSS7 LMS and so will not be described further.

In accordance with an embodiment of the present invention, the first LMS 122 is adapted by the provision of a tagger entity 206, the tagger entity 206 also being able to access data from and/or store data to the CDR store 204 as well as query a reference database 208, the reference database 208 comprising a list of customers and information enabling attribution of a given CDR (or any other detail record) to the customer. Examples of such information to enable attribution are: originating telephone number, destination telephone number, dialled telephone number, International Mobile Subscriber Identity (IMSI), Temporary Mobile Subscriber Identity (TMSI), a Mobile Station International ISDN Number (MSISDN), or an International Mobile Equipment Identity (IMEI).

One or more of the above information, or the like, is contained in one or more field of the CDR. The information contained in the reference database 208 is derived, for example, from a billing or customer database comprising customer identities and customer subscription information held be an operator of the communications network.

The CDR store 204 can be queried by an analysis entity 210, the analysis entity 210 being arranged to retrieve one or more CDR from the CDR store 204 for analysis. Any results of analysis carried out by the analysis entity 210 can be: stored in a metric store file 212, for example on the hard disc drive described above or in a solid state storage device (not shown), used in the real-time generation of graphs and/or tables 214 of performance of the communications network, or used to determine whether or not an alert 216 relating to the performance of the communications network, customer calls or services should be issued. In this respect, the analysis entity 210 comprises a reporting module 218 and an alert module 220.

The structure of the second LMS 142 is (although not always), in this example, identical to the structure of the first LMS 122. Therefore, for the purposes of clarity and conciseness, the structure and operation of the second LMS 142 will not be described.

Figure 3:
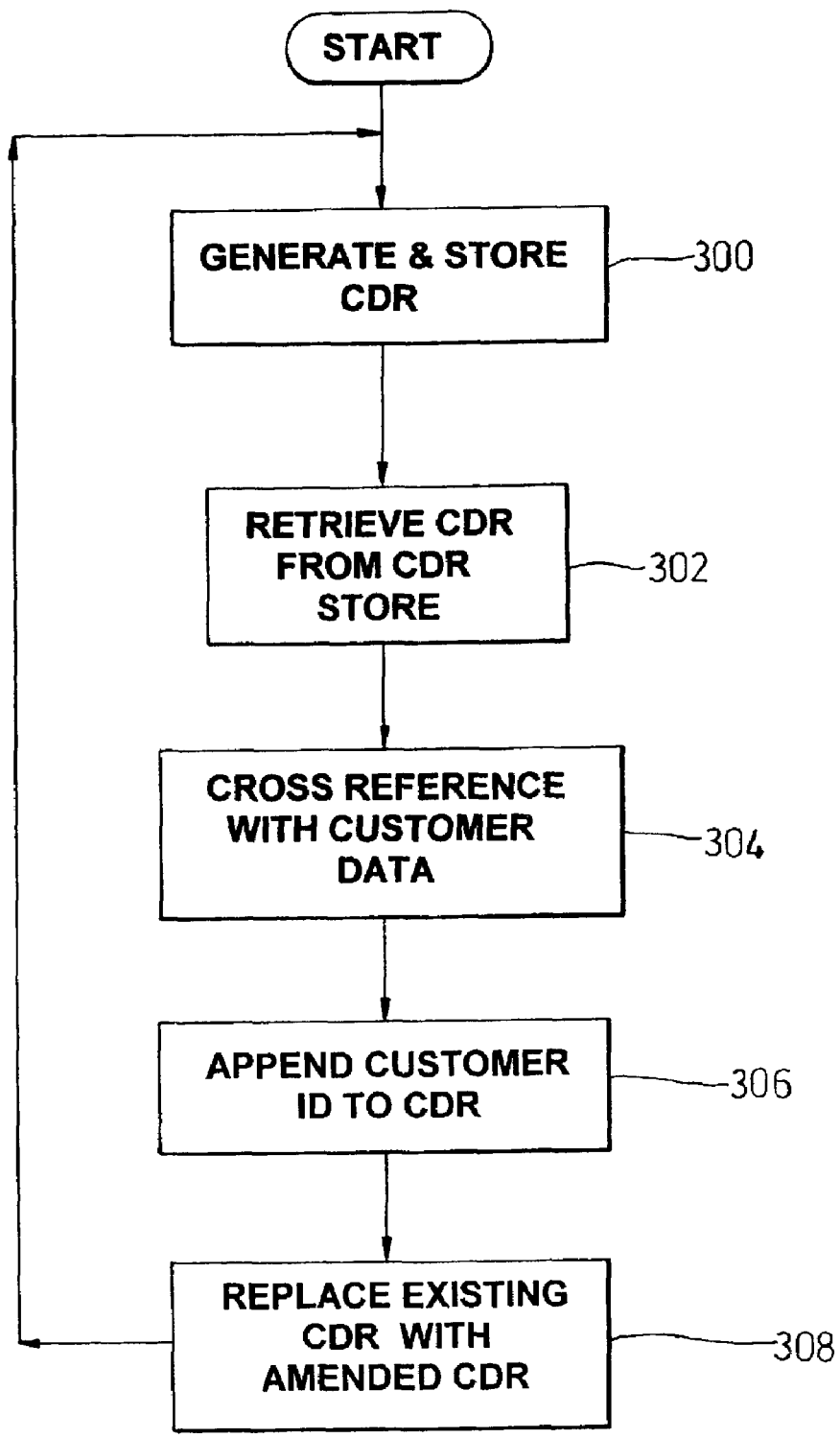
FIG. 3 is a flow diagram of a method employed by the apparatus of FIG. 2.

Operation of the above-described first LMS 122 will now be described with reference to FIG. 3 and in the context of a call established and released according to the SS7 protocol. The call is between the first telephone handset 102 and the second telephone handset 104. As is known, in order to establish, maintain and, eventually, release the call, a number of messages pass between the first and second STPs 104, 108. The messages, in this example, include messages in the form of Message Signal Units (MSUs). The function of the MSU is dictated by the content of a Service Information Octet of the MSU. As MSUs are well known in the context of the SS7 protocol, they will not be discussed further.

In order to commence establishment of the call, the first SSP 104 sends an Initial Address Message (IAM), the basic message necessary to initiate a call between the first telephone handset 102 and the second telephone handset 110.

A copy of the IAM is received by the CDR building entity 200 at the second STP 116 via the data input 202. The CDR builder entity 200 extracts information from Signalling Information Field, including (in this example) the Originating Point Code (OPC), the Destination Point Code (DPC) and the Circuit Identification Code (CIC) (a point code in combination with the CIC defines a unique point in the signalling network 100), an originating telephone number, a dialled telephone number, and a destination telephone number. The extracted information is retained by the CDR builder entity 200 and predetermined subsequent messages received by the CDR builder entity 200 throughout the duration of the call that relate to the IAM are also retained until a Release Complete (RLC) message is received by the CDR builder entity 200, whereupon a CDR is generated (Step 300) by the CDR builder entity 200 using the retained information. The CDR is then stored in the CDR store 204. In another example, instead of awaiting a complete CDR, an incomplete (partial) CDR can be stored in the CDR store 204.

After storage of the CDR in the CDR store 204, the tagging entity 206 retrieves (Step 302) the CDR from the CDR store 204 and reads, in this example, the destination telephone number carried by a field of the CDR. The destination telephone number is used to query (Step 304) the reference database 208 in order to identify a customer using the communications network associated with the destination telephone number. Additionally or alternatively, in this example, the originating telephone number or the dialled telephone number can be used to query the reference database 208. Once the customer corresponding to the destination telephone number has been identified, an identification code uniquely identifying the customer is added, for example appended (Step 306), to the CDR to form an amended (and enriched) CDR, the amended CDR being stored (Step 308) in the CDR store 204, replacing the corresponding, unamended CDR currently stored by the CDR store 204.

The analyser entity 210 subsequently queries the CDR store 204 in order to carry out analysis in connection with one or more, user selectable, customer using one or more stored CDR. Such analysis is known in the art, for example statistics relating to quality of Service (QoS) metrics for the communications network, such as those set forth below in Table 1.

TABLE 1

| Metric | Value/Benefit |
|---|---|
| Call Attempts | This is a base level metric for the customer, indicating the number of calls attempted by the customer. When broken down by Called Number, the Call Attempts metric gives an indication of the geographic regions that the customer attempted to call. |

TABLE 1-continued

| Metric | Value/Benefit |
|---|---|
| Percentage UnAnswered | The Percentage Unanswered metric relates to calls, where the Calling Party has hung up before the Called Number was answered. |
| Percentage Dropped | When broken down by destination pointcode, the telco is able to deduce which carriers are causing the calls that are dropped. This metric also provide a further breakdown by Release Cause. The LEC is thus able pro-actively troubleshoot the communications network for a customer, before the customer notices the problem. |
| Average Holding Time | The Average Holding Time metric can be broken down by Called Number Group in order to provide an indication of which geographic locations are being frequently called. Employees of the customer can thus use this information for marketing, tariff verification or detection of fraudulent use purposes.<br>Also, this information is very useful for the telco, to determine how the customers are impacting their network. For instance, ISPs tend to hold circuits for extended periods of time, resulting in the switches becoming congested quickly. Telcos, tend to want to move the ISP circuits onto switch adjuncts, to lessen the impact on voice traffic. |

For a given customer, the analyser entity 210 queries the CDR store 204 using the identification code corresponding to the given customer. Consequently, only CDRs corresponding to the given customer are retrieved. Analysis of the CDRs, using any known analysis technique, is carried out in connection with the retrieved CDRs, the analysis being targeted at the given customer. The results of the analysis conducted by the analyser entity 210 can be stored in the metric store 212 and/or passed to the reporting module 218 for the generation of the graph and/table 214 and/or passed to the alert module 220 for processing in connection with a predetermined alert. An example of a predetermined alert relates to the Average Holding Time metric mentioned above. A predetermined threshold, such as five minutes, can be set in relation to the Average Holding Time metric. If the Average Holding Time exceeds the predetermined threshold, the alert module 220 issues the alert 216, for example by e-mail message, update of a flag or production of an audible alarm.

Referring back to FIG. 2, in a second embodiment, the CDR builder entity 200 is able to communicate the CDR directly to the tagging entity 206; the provision of the CDR store 204 and the storage of CDRs therein is optional. The tagging entity 206 is also able to communicate the amended CDR directly to the analyser entity 210, i.e. the analyser entity 210 does not have to retrieve the amended CDR from the CDR store 204. Optionally, the tagging entity 206 is able to access and store CDRs in the CDR store 204, if provided.

The structure of the second LMS 142 (although not always) is, in this example, identical to the structure of the first LMS 122. Therefore, for the purposes of clarity and conciseness, the structure and operation of the second LMS 142 will not be described.

Figure 4:
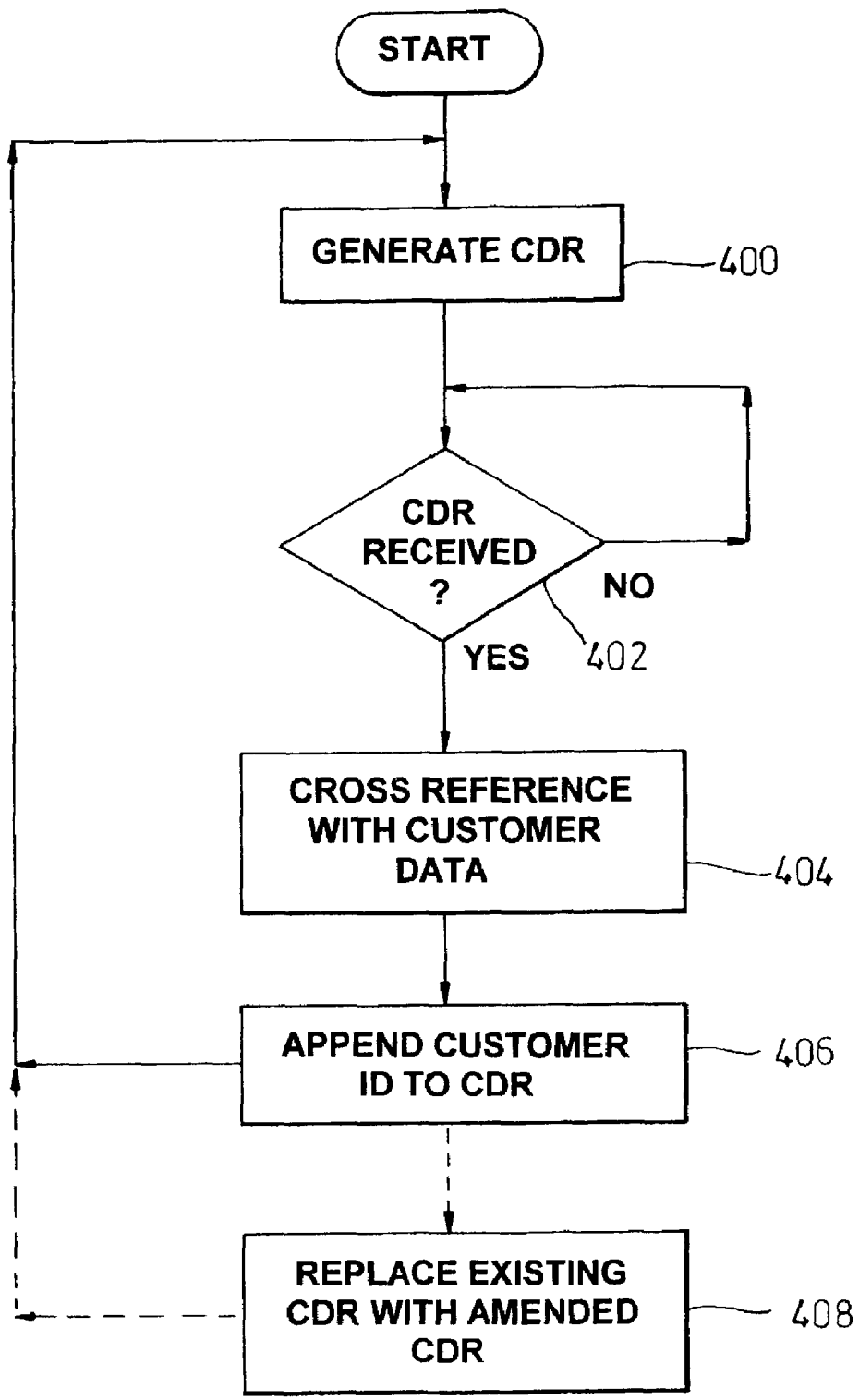
FIG. 4 is a flow diagram of another method alternative to or additional to the method of FIG. 3.

In operation (FIG. 4), the CDR is generated (Step 400) by the CDR builder entity 200 in an identical way to that already described above in connection with the first embodiment. The tagging entity 206 awaits (Step 402) receipt of the CDR directly from the CDR builder entity 200. Upon receipt of the CDR, the tagging entity queries (Step 404) the reference database 208 in the manner already described above to identify the customer associated with the destination telephone number. As also already described above, the identification code is appended (Step 406) to the CDR in order to form the amended CDR. Optionally, the amended CDR can be stored (Step 408) in the CDR store 204 in place of the unamended CDR. The amended CDR is then passed directly to the analysis entity 210 for use in analysis, for example as already described above in connection with the first embodiment. In another example, the CDR can be a partial (incomplete) CDR.

If required the tagging entity 206 can be arranged to simply identify CDRs corresponding to the given customer of interest and simply forward such CDRs directly to the analysis entity 210 without appending the identification code to the CDRs.

In a third embodiment, the above described apparatus is employed in conjunction with other network management tools, for example, switch management software. The combined use of the above apparatus with the switch management software enables improved fault location. As an example, in the event that the above described Percentage Dropped metric for a given customer shows an 80% call failure rate and the switch management software indicates a 90% call failure rate, the combination of the above two call failure rates is indicative of a fault at a switch being analysed by the switch management software. In another example, in the event that the above described Percentage Dropped metric for the given customer shows the 80% call failure rate, but the switch management software indicates a 5% call failure rate, the combination of the above two failure rates is indicative of a fault relating to the handling of the customer call, for example routing, at the switch.

The above described signalling network 100 is purely exemplary and it should be appreciated that the signalling network 100 can comprise a greater or fewer number of nodes than those described above. In addition the provision of the first and second LMS 122, 142 at the first, second, third and fourth STPs 112, 116, 126, 130 respectively, should not be construed as limiting the present invention in any way. It should be understood that one or more LMSs according to the present invention can operate coupled to one or more link of one or more STP, SSP, SEP, SCP or gateway in a given signalling network. Further, it should also be understood that one or more of the LMSs according to the present invention can be coupled to one or more STP, SSP, SEP, SCP or gateway in the given signalling network. Indeed, the tagging entity 206 need not be provided with the LMSs and can be provided at a central measurement and analysis point in the signalling network Similarly, the CDR builder entity 200 need not be provided with the LMSs.

Although the above examples have been described in the context of a telecommunications network having an architecture typical of North America and employing the SS7 protocol, it should be appreciated that the present invention is not limited to this particular telecommunications network or protocol, this invention being applicable to other communications networks and compatible signalling protocols, for example an Integrated Systems Digital Network (ISDN), a Voice over IP (VoIP) network, the Internet, or a cellular communications system, such as a Global System for Mobile communications (GSM) network or a Universal Mobile Telecommunications System (UMTS) network.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared.

The series of computer instructions can constitute all or part of the functionality described above, and can also be stored in any memory device, volatile or non-volatile, such as semiconductor, magnetic, optical or other memory device.

The invention claimed is:

1. A call monitoring apparatus for coupling to a number of links to a switch of a signalling network, the apparatus comprising:
   a data record generator arranged to receive a number of signalling messages and generate a data record using the number of signalling messages, the data record corresponding to a call or transaction associated with the number of messages; and
   a data processor arranged to (a) receive the data record, (b) identify, from a database of customer data, a customer supported by the signalling network and corresponding to the data record, and (c) add additional information to said data record, wherein said additional information corresponds to an identity of said customer.

2. An apparatus as claimed in claim 1, wherein the data record comprises at least one field corresponding to the customer; the database of customer data comprises information to identify the customer and an association with the content of the at least one field.

3. An apparatus as claimed in claim 1, wherein the data record generator is arranged to store the data record in a data record file, the data processor being arranged to update the data record stored in the data record file by adding the additional information to the data record.

4. An apparatus as claimed in claim 1, wherein the data processor is arranged to store the data record with the added additional information in a data record file.

5. An apparatus as claimed in claim 1, further comprising an analysis entity capable of communicating with the data processor, the analysis entity being arranged to receive the data record from the data processor and analyse the data record.

6. An apparatus as claimed in claim 3, further comprising an analysis entity capable of accessing the data record file and retrieving the data record from the data record file and analyse the data record.

7. An apparatus as claimed in claim 5, wherein the analysis entity is arranged to generate a metric for a communications network associated with the signalling network, the metric relating to the customer.

8. A switch for a signalling network, the switch comprising the call monitoring apparatus as claimed in claim 1.

9. A signalling network comprising the call monitoring apparatus as claimed in claim 1.

10. A signalling network as claimed in claim 9, further comprising a switch, the call monitoring apparatus being capable of receiving data records constructed using messages received by the switch.

11. A method of identifying a correspondence between a data record and a customer supported by a network, the method comprising:
    receiving a number of signalling messages originating from a switch of the network;
    generating the data record using data contained in the number of signalling messages, the data record corresponding to a call or transaction associated with the number of messages;
    accessing a database of customer data and identifying the customer, from the database of customer data that corresponds to the data record; and
    adding additional information to said data record, wherein said additional information corresponds to an identity of said customer.

12. A method as claimed in claim 11, wherein the data record comprises at least one field, content of the at least one field corresponding to the customer; the database of customer data comprises information to identify the customer and an association with the content of the at least one field.

13. A method as claimed in claim 11, further comprising:
    storing the data record in a data record file; and
    updating the data record in the data record file by adding the additional information to the data record.

14. A method as claimed in claim 11, further comprising:
    storing the data record with the added additional information in a data record file.

15. A computer program element comprising computer program code means to make a computer execute the method as claimed in claim 11.

16. A computer program element as claimed in claim 15, embodied on a computer readable medium.

17. A use of a database of customer data to identify an association between a customer and a data record formed using a number of signalling messages originating from a switch of a signalling network, the data record corresponding to a call or transaction associated with the number of signalling messages, and the database of customer data comprising information to identify the customer and an association with content of a field of the data record,
    wherein a data processor (a) receives said data record, (b) identifies from said database of customer data, a customer that is supported by said signalling network and that corresponds to said data record, and (c) adds additional information to said data record, wherein said additional information corresponds to an identity of said customer.

18. A call monitoring apparatus for a signalling network, comprising:
    a data record generator that receives a signalling message, and generates a data record based on said signalling message, wherein said data record corresponds to a call or transaction associated with said signalling message; and
    a data processor that (a) receives said data record, (b) identifies from a database of customer data, a customer that is supported by said signalling network and that corresponds to said data record, and (c) adds additional information to said data record, wherein said additional information corresponds to an identity of said customer.

* * * * *